(No Model.)  3 Sheets—Sheet 2.

W. W. WAPLINGTON.
GAS FURNACE.

No. 370,578. Patented Sept. 27, 1887.

WITNESSES:

INVENTOR:
W. W. Waplington
BY Munn & Co
ATTORNEYS.

(No Model.)  3 Sheets—Sheet 3.

W. W. WAPLINGTON.
GAS FURNACE.

No. 370,578. Patented Sept. 27, 1887.

WITNESSES:
John H. Deemer
C. Sedgwick

INVENTOR:
W. W. Waplington
BY Munn & Co.
ATTORNEYS.

UNITED STATES PATENT OFFICE.

WILLIAM WILSON WAPLINGTON, OF WEST MIDDLESEX, PENNSYLVANIA.

GAS-FURNACE.

SPECIFICATION forming part of Letters Patent No. 370,578, dated September 27, 1887.

Application filed August 13, 1886. Serial No. 210,777. (No model.)

*To all whom it may concern:*

Be it known that I, WILLIAM WILSON WAPLINGTON, of West Middlesex, in the county of Mercer and State of Pennsylvania, have invented a new and useful Improvement in Gas-Furnaces, of which the following is a full, clear, and exact description.

This invention, like my previous one, on which Letters Patent No. 259,653 were issued June 13, 1882, and upon which this is an improvement, relates to gas-furnaces for heating, puddling, boiling, steel-melting, and other metallurgical purposes, and for melting glass in pots and for other purposes.

My improved furnace may be used for burning natural gas, although it will be here described more particularly as using artificial gas, and in which there are combined with the heating or working chamber a gas producer or producers, gas-flues, air-flues, air and gas valves, regulators, and heat-retaining flues.

The invention consists in an improved construction of the gas and air ducts or channels, whereby a better distribution of both gas and air is obtained in the heating-chamber of the furnace.

It also provides for using all or practically all the internal surfaces of the flues for regenerative purposes, and employs a simple and inexpensive form of gas and air valves.

It furthermore comprises a construction which adapts the furnace to using both natural and artificial gas, and likewise includes special means for utilizing the heat usually wasted in the ash-pit of gas-producers, all substantially as hereinafter described.

Reference is to be had to the accompanying drawings, forming a part of this specification, in which similar letters of reference indicate corresponding parts in all the figures.

Figure 1:
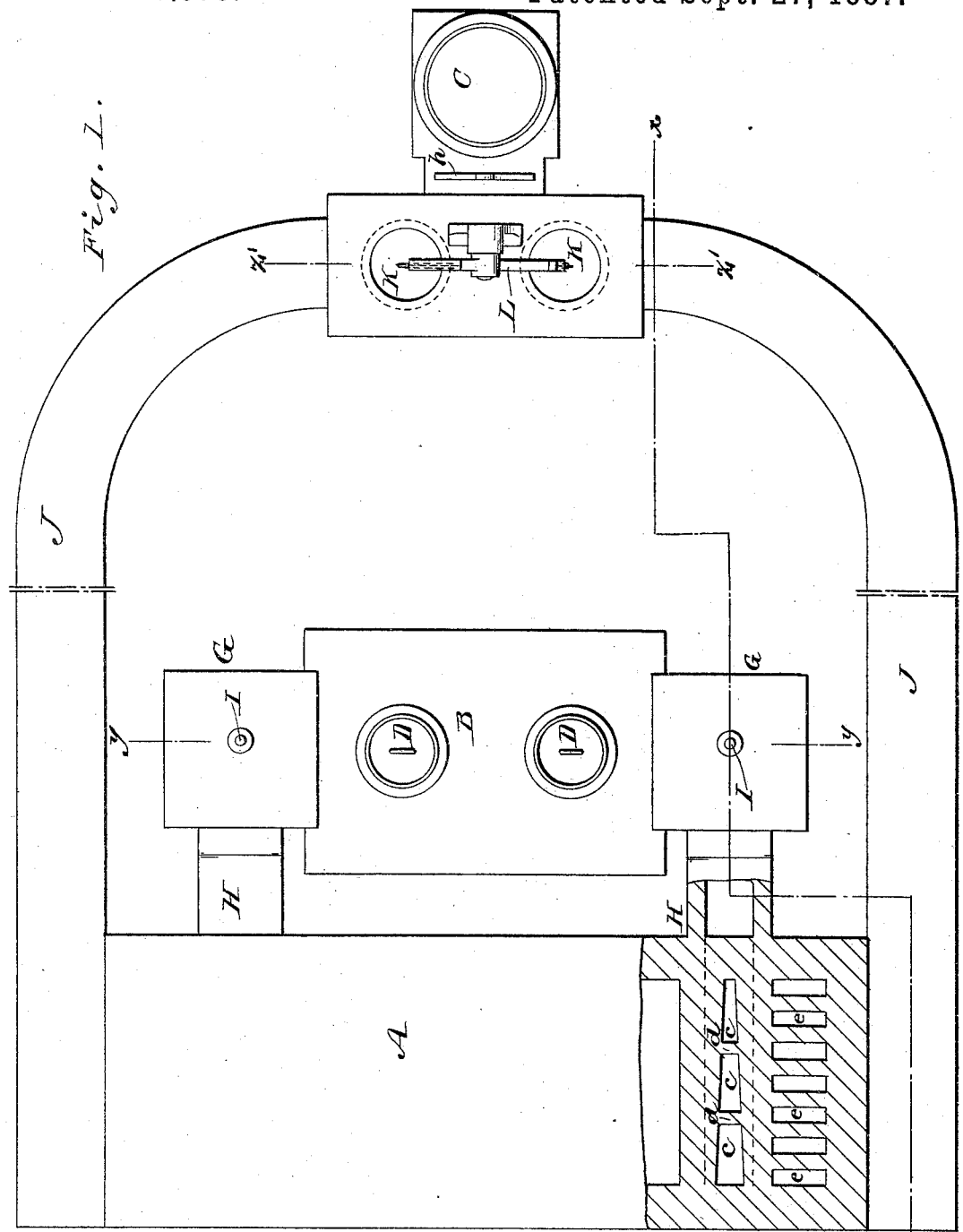
Figure 2:
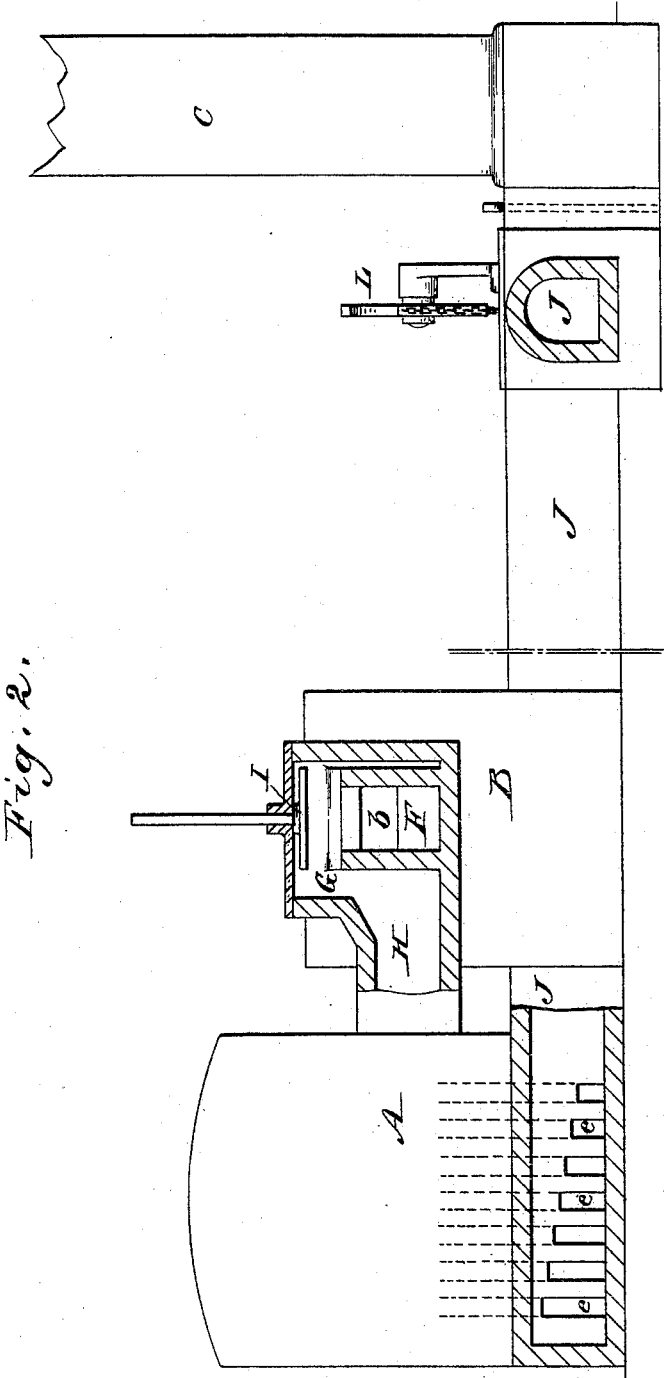
Figure 3:
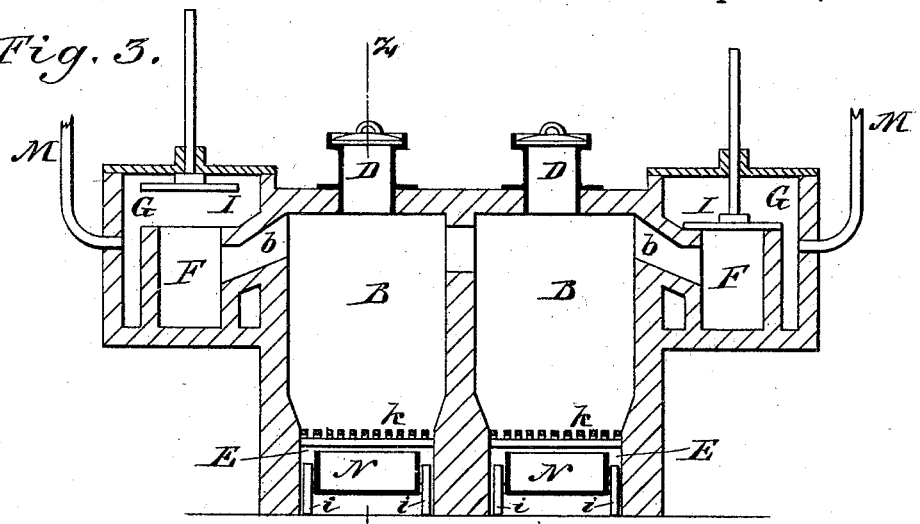
Figure 4:
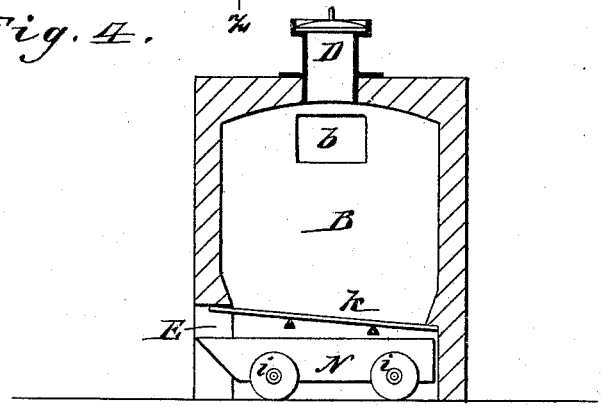
Figure 5:
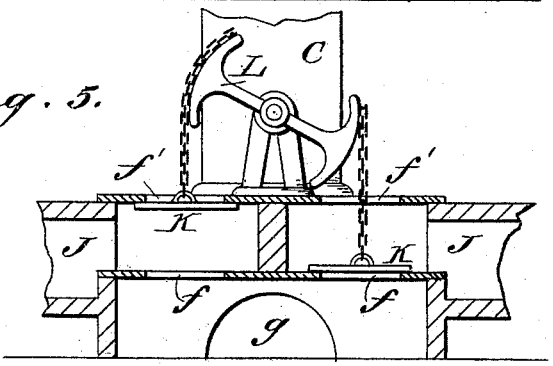

Figure 1 represents a plan view of a metallurgical or other like gas-furnace embodying my invention. Fig. 2 is a vertical section of the same upon the irregular line $x\,x$ in Fig. 1. Fig. 3 is a vertical section upon the line $y\,y$ in Fig. 1. Fig. 4 is a vertical section upon the line $z\,z$ in Fig. 3, and Fig. 5 is a vertical section upon the line $z'\,z'$ in Fig. 1.

A is the furnace, the heating or working chamber of which may be variously constructed to adapt it to the purpose for which it is intended. Said furnace it is designed to sheath externally on its sides and ends with metal plates and to apply binding-rods to its roof, and rail buck-staves to its ends and sides, and to provide it with a suitable aperture for letting out the cinders; but as these and other features are no part of my invention they are not shown in the drawings.

B indicates the gas producer or producers, which in many cases it is desirable not to arrange under the furnace, and therefore I place the same outside of the furnace, preferably at the back of the latter, and the chimney C still farther in the rear again, as shown; but in such case the producers should be placed as close to the furnace as convenient, inasmuch as it is a prime object to supply the gas to the furnace as hot as possible. They might, however, be arranged on one side of the furnace and the chimney on the opposite side without changing any of the essential features of the invention; or, in some cases where it is desirable, producers might be arranged under the furnace; but this would require changes in the gas-valves and other parts, although the air-flues, air-valves, and the means adapted for utilizing the heat under the grates, as hereinafter described, would remain the same. The gas-producers B, which are connected at or near their tops so as to virtually form but one structure, are of a capacity suitable for the purpose they are intended. D D are the feed or coal hoppers of said producers, and E E their ash-pits.

F F are gas-chambers on opposite sides of the combined gas-producers, and to which the gas passes by outlets $b\,b$ at or near the tops of the producers. These gas-chambers are arranged within other chambers, G G, from which the gas is conveyed by flues H H to opposite ends of the working chamber or furnace A alternately upon opening successively the gas-valves I I, which valves are simple disks or plates arranged to close upon or be moved away from the open tops of the gas-chambers F F, said valves either being worked separately or being coupled to work in unison—that is, the one to open and the other to close simultaneously and alternately by or through any suitable appliances connected with their stems, which project through the top plates or covers of the chambers G. It is preferred, however, to work each valve by an independent lever, upon the end of which may be a gage-strip for regulating the flow of gas according to the requirements of the furnace.

Each gas-flue H connects, where it empties into the furnace, with a series of gas-channels, narrow slits or ports $c$ $c$, arranged one in rear of the other, made tapering in directions of their length or width, and of increasing area, each succeeding one farthest removed from the inlet side of the furnace. This construction of the ports $c$ $c$ prevents the gas taking the nearest route to the chimney, and thereby giving the side of the furnace nearest the chimney more gas than the opposite side, and so causing unequal heating of the working-chamber. The stays or divisions $d$ $d$ between said ports $c$ $c$ also prevent distortion of the narrow inlet formed by such ports. The air which is admitted to the furnace to combine with the gas for the purpose of producing combustion is similarly controlled as regards its not being allowed to take the nearest route to the chimney—that is, it is checked by similar means, which consists of a series of narrow ports or channels, $e$ $e$, arranged one in the rear of the other, and with which the main air-supply and spent-gas pipes J J connect, the said ports or channels $e$ $e$ communicating below, as shown in Fig. 2, with either pipe J, and above with the furnace, as shown in Fig. 1, and those of said ports which are nearest to the chimney being of more contracted area either above or below (here shown below) than those which are more distant or nearer the front of the furnace. D-shaped or horseshoe furnaces would require the tapers reversed.

To utilize all or practically all of the flues for regenerative purposes, I place the air-valves K K at or near the bottom of the chimney C, whereby the spent gases are made to do regenerative duty up to the point they enter the chimney. If the conditions are such that short flues and shallow regenerative-chambers are necessary, I build the flues of sufficient width and divide them up into narrow spaces by thin walls to obtain the requisite amount of regenerative surface. The air-valves K K are of a plate or disk construction, like the gas-valves I I, and open and close alternately ports $f f$, which establish communication, respectively, by an opening with the chimney and alternately open and close air inlets or openings $f'$ $f'$ to the flues J J, each of said valves K controlling by its opposite faces and accordingly as it is adjusted an air-inlet port, $f'$, and a spent-gas-outlet port, $f$. The quantity of air admitted by said valves may be regulated by hinged lids applied to the air inlets or openings $f'$ $f'$ in the covers over the chambers in which the air-valves work. Said air-valves K K are reversed by connecting them, as by chains or other attachments, with the opposite ends of a rocking beam, L.

The chimney is provided with a draft-regulator or damper, $h$.

To adapt the furnace for natural gas, it is only necessary to put the supply-pipes M M, which should be provided with suitable regulating-valves, through the walls of the gas flues or chambers G G between the gas-valves I I and the furnace; or said pipes may be otherwise suitably connected with the gas-flues. When using natural gas exclusively, the furnace would need no producer and accompanying valves.

To further economize waste heat in the furnace when supplied with gas from a producer or producers, a water-tank, N, mounted on wheels $i$, is run into each ash-pit E. These tanks are partially filled with water supplied by a suitable pipe, so that the heat thrown down from the grate and the ashes and coke constantly falling into the water will cause vapor to rise from the fuel and so produce water-gas in the producers. The coke, too, that falls into the water, floats, and may from time to time be skimmed off and saved. In this way considerable fuel and waste heat may be economized. The tanks N being on wheels their use as described is facilitated; but, if desired, instead of being thus mounted they may be fixed or built in. The grates $k$ of the producers are set sloping downwardly toward the rear of the ash-pits, and the tanks N are constructed at their tops so that the ashes may be removed from the tanks through the front openings in the ash-pits while the tanks are in place, as shown in Fig. 4.

The general operation is the same as that described in Patent No. 259,653, hereinbefore referred to—that is to say, a regulated amount of gas and a proper quantity of air are simultaneously passed by the reversal at intervals of the gas and air valves first to one end of the furnace and then to the other to effect or keep up combustion, and the waste or spent gases passed to the chimney from the end of the furnace not receiving the air and gas, the gas-valves supplying the one end of the furnace being open while the other is closed, and one air-valve being open to admit air to the main flue, which connects with the end of the furnace receiving the gas and closing the outlet to the chimney, while the other air-valve controlling the end of the furnace from which the supply of gas is shut off is closed against admission of air, but is open to the outlet to the chimney, whereby the heat absorbed from the waste gases in the flues J and ports or passages $e$ $e$ is carried back into the furnace alternately at either end of the latter, and the gases from the producers enter the working-chamber sufficiently hot to insure rapid combustion by combining with the heated air passing along the already heated flues J and ports or passages $e$ $e$; but the position of the air-valves near the entrance to the chimney increases the regenerative effect, and by the ports or passages $c$ $e$, which connect the main flues H and J with the furnace, being of contracting area as they approach the chimney or air and gas valves, and of increasing area where or as they increase their distance from the chimney or air and gas valves, a much more equal distribution of heat is obtained at opposite sides of and throughout the furnace.

I am aware that it is not new to provide a furnace near the lower end with tuyere-openings of varying sizes, being largest nearest the bottom, and that it is not new to provide means for the use of natural gas in a metallurgical furnace, nor to employ plate-like valves adapted to control air-inlets and gas-outlets upon their opposite sides or faces, nor to employ in connection with the fire-grate of a furnace a water-receptacle.

Having thus fully described my invention, what I claim as new, and desire to secure by Letters Patent, is—

1. In a gas-furnace for metallurgical and other purposes, the heating or working chamber A, provided at or near its opposite ends with gas-supply ports or channels $c\,c$ and air-supply and spent-gas ports or channels $e\,e$, divided by supports or stays and of contracting area toward the gas and air inlet side of the furnace, whereby a more equal distribution of the gas and air in said chamber is obtained, substantially as specified.

2. In a gas-furnace for metallurgical and other purposes, the combination, with the heating or working chamber A, of the main gas-flues H H, valves controlling the admission of gas thereto, the tapering gas channels or ports $c\,c$, the main air and spent-gas flues J J, with their connecting ports or channels $e\,e$, of contracting area toward the inlet-side of the furnace, the chimney C, and the air-valves arranged in proximity to said chimney and adapted to control the flues J J, substantially as specified.

3. The gas-producers B, in combination with the main gas-flues H H, valves controlling the admission of gas to said flues, the heating or working chamber A, and the tapering ports or channels $c\,c$, connecting said flues with said chamber, essentially as described.

WILLIAM WILSON WAPLINGTON.

Witnesses:
HARRY SEARLES PORTER,
REUBEN WILLIAMSON.